(12) United States Patent
Dong

(10) Patent No.: US 8,223,490 B2
(45) Date of Patent: Jul. 17, 2012

(54) LATCHING MECHANISM AND ELECTRONIC DEVICE USING THE SAME

(75) Inventor: Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 346 days.

(21) Appl. No.: 12/644,100

(22) Filed: Dec. 22, 2009

(65) Prior Publication Data
US 2011/0007457 A1 Jan. 13, 2011

(30) Foreign Application Priority Data
Jul. 13, 2009 (CN) .......................... 2009 1 0304294

(51) Int. Cl.
*H05K 5/00* (2006.01)
(52) U.S. Cl. ............ 361/679.58; 361/801; 361/802; 361/803; 361/726; 361/732; 361/747; 361/759; 361/679.01; 361/679.55; 361/679.56; 361/679.57; 455/550.1; 455/575.8; 455/90.3; 429/96; 429/97; 429/100
(58) Field of Classification Search ............... 455/550.1, 455/575.8, 90.3; 361/801–803, 726, 732, 361/747, 759, 679.01, 679.55–679.58; 429/96, 429/97, 100
See application file for complete search history.

(56) References Cited

U.S. PATENT DOCUMENTS

| | | | | |
|---|---|---|---|---|
| 5,620,242 A | * | 4/1997 | Leon et al. ................. | 312/223.1 |
| 6,134,116 A | * | 10/2000 | Hoss et al. .................... | 361/747 |
| 7,436,656 B2 | * | 10/2008 | Jiang et al. ............... | 361/679.55 |
| 7,865,151 B2 | * | 1/2011 | Cho ............................ | 455/90.3 |
| 7,983,037 B2 | * | 7/2011 | Zhang et al. ............ | 361/679.55 |
| 2004/0192418 A1 | * | 9/2004 | Nam ......................... | 455/575.1 |
| 2004/0224220 A1 | * | 11/2004 | Wang et al. ..................... | 429/96 |
| 2006/0175840 A1 | * | 8/2006 | Wang et al. .................... | 292/228 |
| 2007/0026888 A1 | * | 2/2007 | Zhou ......................... | 455/550.1 |
| 2008/0268329 A1 | * | 10/2008 | Mackle et al. .................. | 429/97 |
| 2009/0303668 A1 | * | 12/2009 | Zhao et al. ............... | 361/679.01 |

* cited by examiner

*Primary Examiner* — Hung S Bui
*Assistant Examiner* — James Wu
(74) *Attorney, Agent, or Firm* — Altis Law Group, Inc.

(57) ABSTRACT

A latching mechanism for a portable electronic device includes an assembly seat, two latching members, two resilient members and a pressing member, the two latching members are pivotably positioned on the assembly seat, the two resilient members are secured on the assembly seat and resist the two latching members respectively, the pressing member is resisted by the two latching members and is slidable relative to the assembly seat.

15 Claims, 4 Drawing Sheets

LATCHING MECHANISM AND ELECTRONIC DEVICE USING THE SAME

BACKGROUND

1. Technical Field

The disclosure relates to latching mechanisms and electronic devices; and particularly to a latching mechanism for connecting a cover to a housing of an electronic device.

2. Description of Related Art

Portable electronic devices such as mobile phones are widely used. When a battery is installed in the portable electronic device, the battery may be shielded and fixed in place by a cover latched with a housing of the portable electronic device.

The cover commonly includes a pin at one end and a protrusion at an opposite end. The housing defines a receiving hole and a holding aperture. The protrusion can be received in the holding aperture, and the cover pushed towards the housing until the pin is received in the receiving hole. As such, the cover securely engages the housing by seating of the protrusion in the holding aperture. However, removal of the pin from the receiving hole, when the cover is removed from the housing, requires considerable external force.

Therefore, there is room for improvement within the art.

BRIEF DESCRIPTION OF THE DRAWINGS

Many aspects of the present latching mechanism and electronic device using the same can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
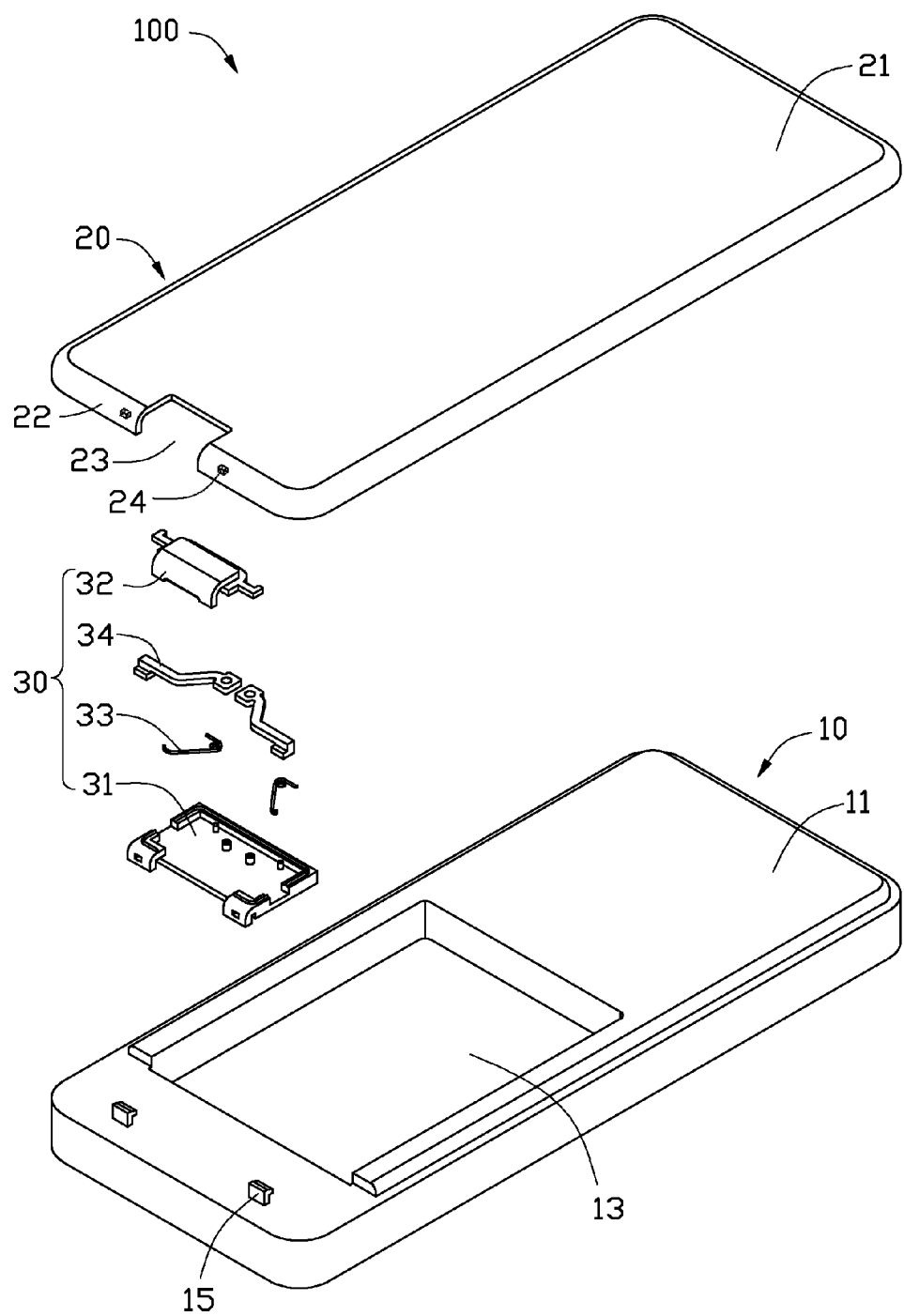
FIG. 1 is a disassembled view of a portable electronic device having a latching mechanism as disclosed.

FIG. 1 shows a portable electronic device 100 such as a mobile phone including a housing 10, a cover 20, and a latching mechanism 30 for latching the housing 10 to the cover 20. The housing 10 has a rear surface 11. The rear surface 11 has a battery receiving recess 13 defined therein and two hooks 15 protruding from an end thereof. The hooks 15 are bent toward the receiving recess 13 in an L-shape.

The cover 20 engagable with the housing 10 includes a main plate 21 and an arcuate peripheral wall 22 around the main plate 21. The peripheral wall 22 defines a notch 23 therein to receive the latching mechanism 30. The peripheral wall 22 has two protrusions 24 protruding from the inner surface thereof. The protrusions 24 are located at two sides of the notch 23, which are configured for engaging with the latching mechanism 30.

Figure 2:
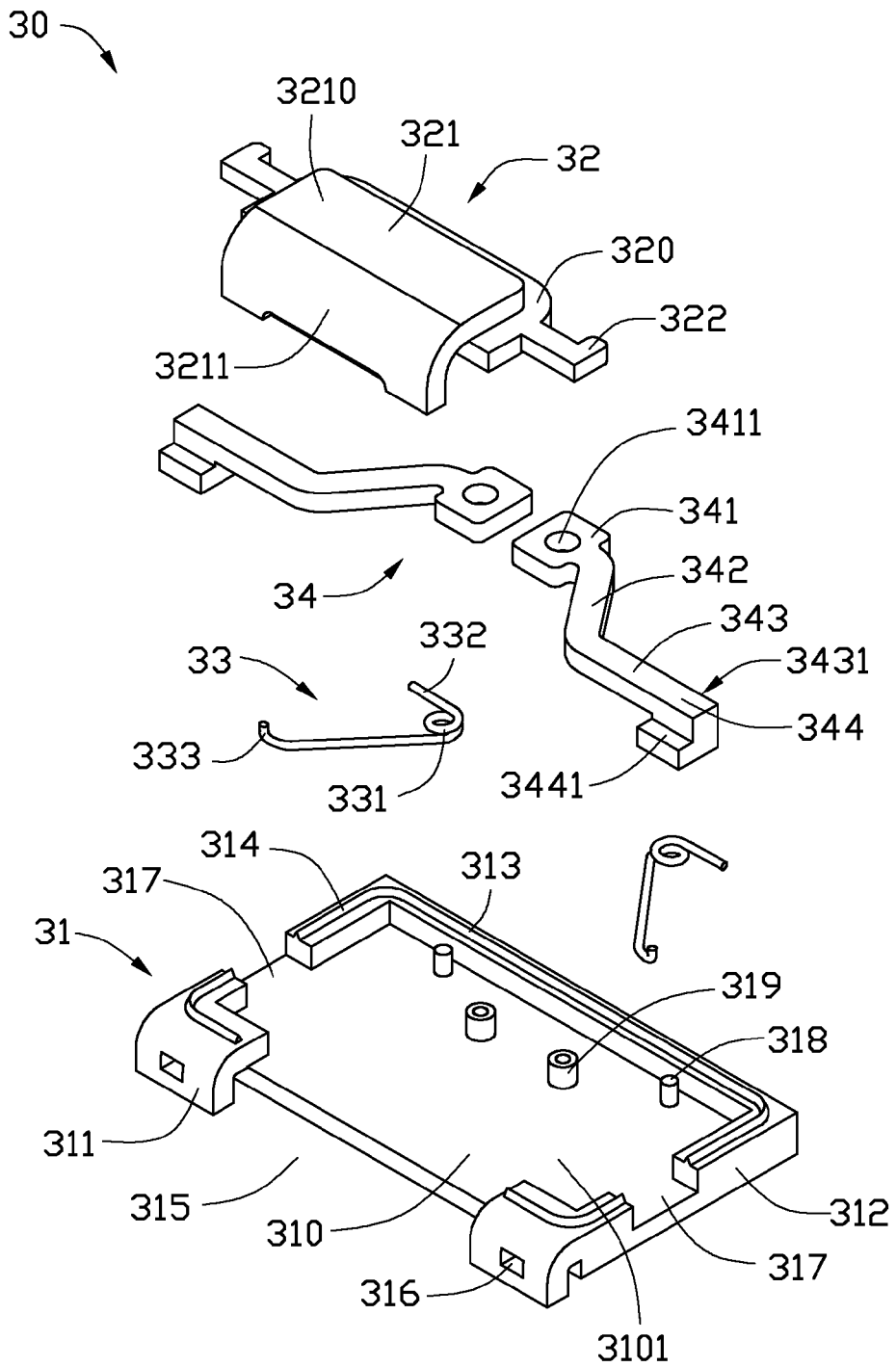
FIG. 2 is a disassembled view of the latching mechanism shown in FIG. 1.

Referring to FIG. 2, the latching mechanism 30 includes an assembly seat 31, a pressing member 32, two resilient members 33, and two latching members 34. The assembly seat 31 includes a bottom wall 310, a first sidewall 311, a second sidewall 312, a third sidewall 313 opposite to first sidewall 31, and a fourth sidewall 314 opposite to the second sidewall 312. The sidewalls 311, 312, 313, 314 enclose the bottom wall 310 to define a receiving chamber 3101. The first sidewall 31 is arcuate to engage the peripheral wall 22 and defines a cutout 315 to receive the pressing member 32. The first sidewall 311 defines two engaging holes 316 at two sides of the cutout 315 positioned to latch with the two protrusions 24 of the peripheral wall 22. The second sidewall 312 and the fourth sidewall 314 define an opposite rectangular opening 317 respectively to engage with portions of the two latching members 34. The bottom wall 310 has two cylindrical first holding poles 318 and two cylindrical second holding poles 319. The two first holding poles 318 are positioned adjacent to the third sidewall 313 respectively to secure the two resilient members 33 respectively. The two second holding poles 319 are located proximately a middle portion of the bottom wall 310 is used to secure the two latching members 34.

The pressing member 32 includes a main plate portion 320, a pressing plate portion 321 integrally formed on the main plate portion 320, and two resisting lugs 322 extending laterally at two sides of the main plate portion 320. The main plate portion 320 is rectangular and has the same width as the cutout 315 of the first sidewall 311. The main plate portion 320 engages with the cutout 315 and is slidably received in the receiving chamber 3101 of the assembly seat 31. The pressing plate portion 321 is suitably sized and shaped to be slidably received in the notch 23 of the peripheral wall 22. The pressing plate portion 321 includes a flat plate section 3210 and an arcuate plate section 3211 extending laterally from the flat plate section 3210. The flat plate section 3210 is shorter than the notch 23 in deep and attaches at a side of the main plate portion 320. The arcuate plate section 3211 encloses a side of the main plate portion 320 and is used for manipulation of the pressing member 32. The two resisting lugs 322 are L-shaped and are engagable with two corners of the receiving chamber 3101, the resisting lugs 322 are used to resist against the two latching members 34 respectively.

The resilient member 33 is a torsion spring and configured to exert a force on the latching member 34. The resilient member 33 includes a connecting portion 331, a first elastic arm 332, and a second elastic arm 333. The connecting portion 331 is helical and engages with the first holding pole 318 correspondingly, the first elastic arm 332 and the second elastic arm 333 resist the third sidewall 313 and the latching member 34 respectively.

The latching member 34 slidably received in the assembly seat 31 includes a hinge end portion 341, a connecting arm portion 342, a resisting arm portion 343, and a latching end portion 344. The hinge end portion 341 defines a circular bore 3411 to receive the second holding pole 319, thus the hinge end portion 341 is pivotably connected to the second holding pole 319. The connecting arm portion 342 extends in from the hinge end portion 341 and is deflected after assembling relative to third sidewall 313. The resisting arm portion 343 is connected to the connecting arm portion 342 and is parallel with the third sidewall 313 after assembling. The resisting arm portion 343 includes a resisting surface 3431 facing the third sidewall 313. The latching end portion 344 is formed at the tail end of the resisting arm portion 343 and includes a latching step 3441. The latching step 3441 extends laterally from the opposite surface to the resisting surface 3431 and is used to latch to the hook 15 of the housing 10.

Figure 3:
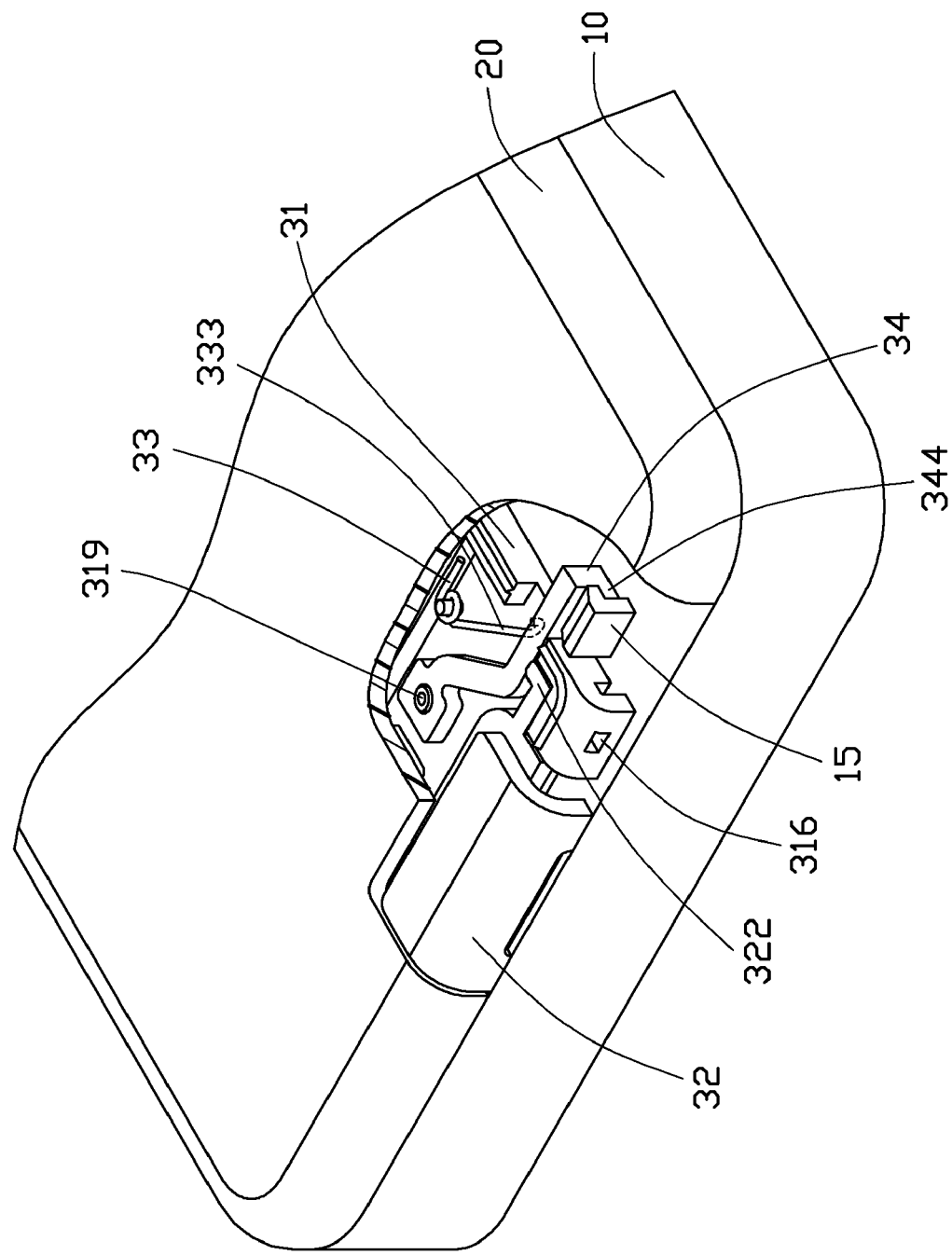
FIG. 3 is an assembled sectional partial view of the latching mechanism shown in FIG. 1.
Figure 4:
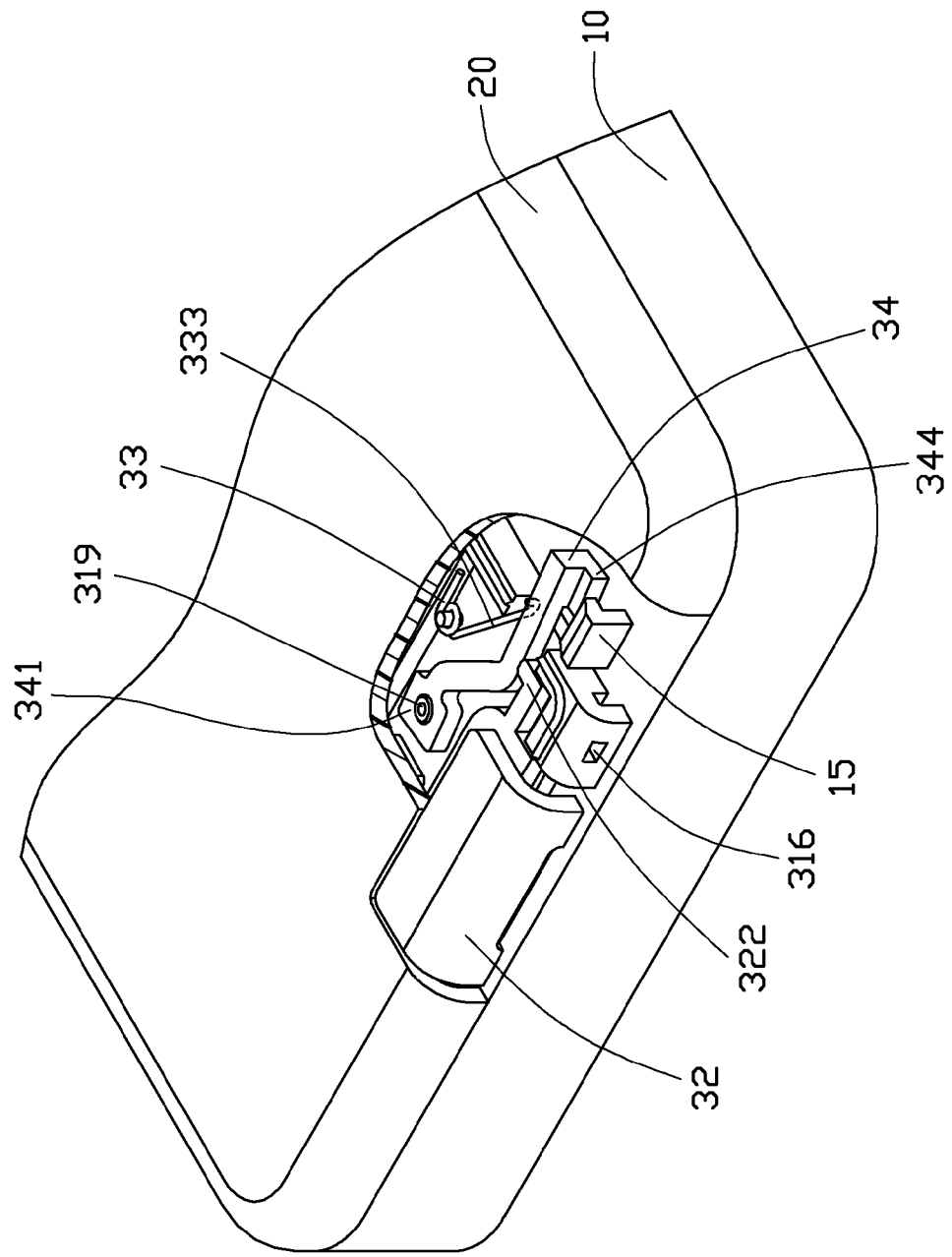
FIG. 4 is a cutout-away partial view of the latching mechanism in manipulation shown in FIG. 1.

Referring to FIG. 3, to assemble the latching mechanism 30, the pressing member 32 is slidably positioned in the receiving chamber 3101 of the assembly seat 31, the main plate portion 320 abuts the bottom wall 310 of the assembly seat 31 and engages with the cutout 315, the pressing plate portion 321 is received in the notch 23 of the peripheral wall 22, the two resisting lugs 322 engage with two corners of the receiving chamber 3101 correspondingly. The two latching member 34 are assembled in the receiving chamber 3101. The bore 3411 of the hinge end portion 341 pivotably receives the second holding pole 319 therein. The resisting arm portions 343 parallel with the third sidewall 313 pass through the two openings 317 of the second sidewall 312 and the fourth sidewall 314 respectively, thus the latching end portion 344 is exposed from the receiving chamber 3101 of the assembly seat 31. The resilient member 33 is assembled, in which the connecting portion 331 of the resilient member 33 correspondingly engages with the first holding pole 318, the first elastic arm 332 resists the third sidewall 313, and the second elastic arm 333 resists against the resisting surface 3431 of the latching member 34, thus the resilient member 33 provides a force to pull the latching member 34 to rotate about the second holding pole 319. At the same time, the two resisting lugs 322 of the pressing members 32 respectively contact the resisting arm portions 343. Thereby, the latching mechanism 30 is substantially assembled.

When the latching mechanism 30 is to be assembled to the cover 20, the two protrusions 24 of the peripheral wall 22 are latched into the engaging holes 316 of the first sidewall 311. The pressing plate portion 321 is slidably received in the notch 23 of the peripheral wall 22. Because the flat plate section 3210 is shorter than depth of the notch 23, a slide space is formed allowing the sliding of the pressing plate portion 321. Then, to assemble the cover 20 into the housing 10, the pressing member 32 is pushed toward the third sidewall 313 of the assembly seat 31, the two resisting lugs 322 of the pressing members 32 resist the two latching members 34, and the two latching members 32 rotate about the second holding pole 319. The resisting arm portions 343 rotate towards the third sidewall 313 in the openings 317 of the second sidewall 312. Meanwhile, the two latching members 34 compress the two resilient members 33 and the resilient members 33 accumulate elastic energy. The cover 20 covers the rear surface 11 of the housing 10, and the latching step 3441 of the latching member 34 aligns with the hook 15 of the housing 10. Then, when the latching members 32 are released, the latching member 34 returns to original position by the force of the resilient members 33, thus the latching step 3441 of the latching member 34 latches with the hook 15. Therefore, the cover 20 is secured with the housing 10.

To open the cover 20 from the housing 10, the pressing member 32 is pressed and the latching step 3441 of the latching member 34 disengages from the hook 15, and the cover 20 can be opened.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A latching mechanism for a portable electronic device, comprising:
   an assembly seat including two first holding poles;
   two latching members pivotably positioned on the assembly seat;
   two resilient members, each resilient member being a torsion spring secured on the first holding pole of the assembly and resisted by the latching member; and
   a pressing member slidably arranged in the assembly seat and resisted by the two latching members;
   wherein the pressing member is pressed and slides on the assembly seat, the two latching members rotate correspondingly by pushing of the pressing member and the two resilient members are compressed by the two latching members.

2. The latching mechanism as claimed in claim 1, wherein the assembly seat includes a bottom wall and four sidewalls, the bottom wall and the four sidewalls cooperatively encloses a receiving chamber, one of the sidewalls defines a cutout, the two latching members, the two resilient members and the pressing member are received in the receiving chamber with the pressing member engaging the cutout.

3. The latching mechanism as claimed in claim 2, wherein the first holding pole protrudes from the bottom wall, the resilient member includes a connection portion, a first elastic arm and a second elastic arm, the connecting portion is secured with the first holding pole, the first elastic arm resist with one of the sidewalls and the second elastic arm resist with the latching member.

4. The latching mechanism as claimed in claim 2, wherein the latching member includes a hinge end portion, a resisting arm portion and a latching end portion, the bottom wall has a second holding pole to pivotably connect with the hinge end portion, a sidewall defines an opening, the resisting arm portion extends through the opening with the latching end portion is exposed from the receiving chamber.

5. The latching mechanism as claimed in claim 4, wherein the pressing member includes a main plate portion and a resisting lug extending laterally from a side of the main plate portion, the main plate portion has the same width as the cutout and is slidably received in the receiving chamber, the resisting lug resists with the resisting arm portion.

6. A portable electronic device, comprising:
   a housing having two hooks formed thereon;
   a cover detachably engaging with the housing;
   a latching mechanism assembled to the cover;
   wherein the latching mechanism includes an assembly seat, two latching members, two resilient members and a pressing member, the two latching members are pivotably positioned on the assembly seat, the two resilient members are secured on the assembly seat and respectively resist the two latching members, the pressing member having two latching steps is resisted by the two latching members and sildable relative to the assembly seat, the two latching steps sildably latch with the two hooks of the housing;
   wherein the assembly seat forms two first holding poles, the resilient member is torsion spring, each resilient member is secured with the first holding pole and resist with the latching member.

7. The portable electronic device as claimed in claim 6, wherein the cover includes a peripheral wall, the peripheral wall defines a notch, the pressing member is slidably received in the notch.

8. The portable electronic device as claimed in claim 7, wherein the assembly seat defines two engaging holes, the peripheral wall forms two protrusions on the inner surface, the two engaging holes correspondingly receive the two protrusions therein.

9. The portable electronic device as claimed in claim 6, wherein the each latching members has a resisting arm portion, the pressing member includes a main plate portion and two resisting lugs extending laterally from two sides of the main plate portion, the main plate portion is slidably assembled in the assembly seat, and the two resisting lugs resists with the two resisting arm portions respectively.

10. The portable electronic device as claimed in claim 6, wherein the assembly seat includes a bottom wall and four sidewalls cooperatively encloses a receiving chamber, the latching members, the resilient members and the pressing member are received in the receiving chamber.

11. The portable electronic device as claimed in claim 10, wherein one of the sidewalls defines a cutout, the pressing member slidably engages with the cutout.

12. The portable electronic device as claimed in claim 11, wherein each latching member includes a hinge end portion, a resisting arm portion and a latching end portion, the bottom wall forms two second holding poles, the hinge end portion pivotably connect with the second holding pole, the two opposite sidewalls defines an opening respectively, the resisting arm portion of each latching member extends through the opening with the latching end portion is exposed from the receiving chamber.

13. The portable electronic device as claimed in claim 12, wherein the latching end portion forms the latching step to latch with the hook of the housing.

14. A portable electronic device, comprising:
a housing having two hooks formed thereon;
a cover;
a latching mechanism assembled to the cover, the latching mechanism comprising:
a separate assembly seat attached to the cover, the assembly seat including a bottom wall;
two separate latching members positioned on the bottom wall of the assembly seat and pivoted along two different axes and in opposite directions, the latching members latching with the hooks of the housing;
two resilient members, each resilient member including a connecting portion, a first elastic arm, and a second elastic arm, the first elastic arm and the second elastic arm angled each other, the connecting portion rotatably attached on the bottom wall, the first elastic arm and the second elastic arm respectively abutting against the assembly seat and a corresponding latching member;
a pressing member having two latching steps, the latching steps resisted by the two latching members;
wherein the pressing member is slid relative to the assembly seat, the two latching steps sildably push the latching member to unlock the two hooks of the housing, and the resilent members provide a resilient force to the latching member; wherein the assembly seat forms two first parallel holding poles, the resilient member is torsion spring, the connecting portions of the resilient member are attached to the first holding poles.

15. The portable electronic device as claimed in claim 14, wherein the assembly seat forms two second holding poles, each latching member includes a hinge end portion, a resisting arm portion and a latching end portion, the hinge end portion pivotably connect with the second holding pole, the resisting arm portion of each latching member extends through the assembly seat, and the latching end portion is exposed from the assembly seat.

* * * * *